(12) United States Patent
Morbitzer

(10) Patent No.: US 6,781,505 B2
(45) Date of Patent: Aug. 24, 2004

(54) THERMALLY ACTUATED SWITCH

(75) Inventor: Hans-Peter Morbitzer, Atzenbrugg (AT)

(73) Assignee: Electrovac, Fabrikation elektrotechnischer Spezialartikel Gesellschaft m.b.H., Klosterneuburg (AT)

( * ) Notice: Subject to any disclaimer, the term of this patent is extended or adjusted under 35 U.S.C. 154(b) by 0 days.

(21) Appl. No.: 10/371,605

(22) Filed: Feb. 21, 2003

(65) Prior Publication Data

US 2003/0161381 A1 Aug. 28, 2003

(30) Foreign Application Priority Data

Feb. 25, 2002 (AT) .............................................. 279/2002

(51) Int. Cl.⁷ .......................... H01H 37/46; H01H 37/48
(52) U.S. Cl. ...................................... 337/394; 374/208
(58) Field of Search .............................. 374/208, 195, 374/205, 206, 207, 187; 337/394, 393, 395; 219/448.11, 448.19

(56) References Cited

U.S. PATENT DOCUMENTS

| | | | | |
|---|---|---|---|---|
| 1,489,116 A | * | 4/1924 | Chevenard | 374/187 |
| 2,185,623 A | * | 1/1940 | Beam | 337/394 |
| 2,705,746 A | * | 4/1955 | Strange | 337/393 |
| 2,705,747 A | * | 4/1955 | Strange | 337/393 |
| 2,777,919 A | * | 1/1957 | Harness | 337/393 |
| 2,809,523 A | * | 10/1957 | Burling et al. | 337/394 |
| 2,990,716 A | * | 7/1961 | Butts | 337/393 |
| 3,004,123 A | | 10/1961 | Cannon | |
| 3,130,354 A | * | 4/1964 | Burling | 361/164 |
| 3,158,718 A | * | 11/1964 | McCarrick | 337/393 |
| 3,282,108 A | * | 11/1966 | Bordeaux et al. | 337/394 |
| 3,594,675 A | * | 7/1971 | Willson | 337/395 |
| 3,842,675 A | * | 10/1974 | Hunt | 374/207 |
| 4,050,044 A | * | 9/1977 | Fischer et al. | 337/137 |
| 4,901,049 A | * | 2/1990 | Kicherer et al. | 337/394 |
| 5,294,907 A | * | 3/1994 | Katchka | 337/394 |

FOREIGN PATENT DOCUMENTS

| | | |
|---|---|---|
| DE | 1117 332 | 11/1961 |
| DE | 1 648 267 | 4/1972 |
| DE | 34 23 086 A1 | 1/1985 |
| DE | 35 40 414 A1 | 5/1987 |
| EP | 0 476 304 A2 | 3/1992 |
| EP | 0884927 A2 | 12/1998 |
| GB | 2 145 565 | 3/1985 |
| GB | 2278237 A | 11/1994 |

* cited by examiner

*Primary Examiner*—Diego Gutierrez
*Assistant Examiner*—Stanley J. Pruchnic, Jr.
(74) *Attorney, Agent, or Firm*—Henry M. Feiereisen

(57) ABSTRACT

A temperature sensor includes a sensor tube and a sensor rod received in the sensor tube and having a thermal expansion coefficient which differs from a thermal expansion coefficient of the sensor tube. The sensor rod has one end, which is supported by a free end of the sensor tube, and another end, which forms an actuating element of a switching contact assembly. An insulating member at least partly surrounds the switching contact assembly and has an opening for passage of the sensor tube with accommodated sensor rod. Mounted to the insulating member in the area of the opening is a support plate which is connected at least indirectly to the sensor tube by a welding process such that an opening-surrounding wall portion of the insulating member is held in place.

28 Claims, 5 Drawing Sheets

THERMALLY ACTUATED SWITCH

CROSS-REFERENCES TO RELATED APPLICATIONS

This application claims the priority of Austrian Patent Application, Serial No. A 279/2002, filed Feb. 25, 2002, pursuant to 35 U.S.C. 119(a)–(d), the disclosure of which is incorporated herein by reference.

BACKGROUND OF THE INVENTION

The present invention relates, in general, to a temperature sensor of a type including a sensor tube and a sensor rod, which is arranged in the sensor tube and has a thermal expansion coefficient that differs from a thermal expansion coefficient of the sensor tube.

In typical temperature sensors, the sensor rod has one end, which is supported in the area of the free end of the sensor tube, and another end, which forms the actuating element of a switching contact assembly and is surrounded at least partially by an insulating member. The sensor tube with the accommodated sensor rod is guided through an opening of the insulating member, with a support plate being provided in the area of the opening and either directly connected to the sensor tube, supported at the opening, or connected to a tubular insert, placed in the opening and supporting the sensor tube. Conventionally, the tubular insert of the sensor tube has been screwed to the support plate in the opening of the insulating member, or these components have been connected to one another through riveting or interlacing. As a consequence, gaps are formed that allow access to the interior of the insulating member, which houses the switching contact assembly. Thus, particles may penetrate from outside and adversely affect the switching behavior of the switching contact assembly.

Temperature sensors are also known in which one end of the sensor rod is a supported by end piece in the area of the free end of the sensor tube, and the other end of the sensor rod is configured as actuating element of a switching contact assembly. Temperature sensors, which trigger actuation of a switching contact as a result of different thermal expansion coefficients of their components, have proven their ruggedness in practice. As they are manufactured on a large scale, temperature sensors should be as reliable as possible and cost-efficient. While implementation of a smallest possible size and a smallest possible material consumption is desired, the production should also result in temperature sensors that are still reliable in operation to ensure a proper actuation of the switching contact system. The active length available for contact actuation and affected by the thermal elongation, as the temperature sensor is heated, should therefore be as long as possible in relation to the overall length of the temperature sensor.

European Pat. No. EP 0 476 304 A describes a temperature sensor with an end piece for the sensor tube, whereby the sensor tube extends into the end piece so that a significant portion of the length of the sensor tube is lost for the active length of the temperature sensor.

It would therefore be desirable and advantageous to provide an improved temperature sensor which obviates prior art shortcomings and which is constructed to seal the insulating member with the switching contact assembly in the area of the opening for the sensor tube in a dust-tight manner against the ambient environment.

It would also be desirable and advantageous to provide an improved temperature sensor which is simple in structure and cost-efficient to manufacture, while realizing a rapid, permanent and play-free securement of the sensor tube or combination of sensor tube and tubular insert.

It would also be desirable and advantageous to provide an improved temperature sensor which is so constructed as to afford a greatest possible active length.

SUMMARY OF THE INVENTION

According to one aspect of the present invention, a temperature sensor includes a sensor tube, a sensor rod received in the sensor tube and having a thermal expansion coefficient, which differs from a thermal expansion coefficient of the sensor tube, with the sensor rod having one end, which is supported by a free end of the sensor tube, and another end, which forms an actuating element of a switching contact assembly, an insulating member constructed to at least partly surround the switching contact assembly and having an opening for passage of the sensor tube with accommodated sensor rod, a support plate mounted to the insulating member in the area of the opening and connected at least indirectly to the sensor tube by a welding process such that an opening-surrounding wall portion of the insulating member is held in place.

According to another feature of the present invention, the support plate may be welded directly to the sensor tube so that the opening-surrounding wall portion of the insulating member is held between the support plate and the sensor tube. As an alternative, the support plate may be welded to a tubular insert, placed into the opening for support of the sensor tube, so that the opening-surrounding wall portion of the insulating member is held between the support plate and the tubular insert. In either case, through application of a welding process, the support plate can be connected to the sensor tube or the tubular insert for the sensor tube in such a manner that no dust particles can penetrate from outside into the interior of the insulating member. The welding process represents also a cost-efficient and rapid method to connect the respective components and to secure the components to be connected in place. Of course, the sensor tube should be made of metal, when the support plate is directly welded to the sensor tube. Examples of suitable metal include high temperature-resistant metal, such as a CrNi alloy.

Suitably, the support plate is configured for attachment of the temperature sensor to a desired device. According to another feature of the present invention, the support plate may have a bore for allowing attachment of the temperature sensor to a heating element.

According to another feature of the present invention, the tubular insert may have an outer diameter, which is smaller than a diameter of the opening of the insulation member, and an inner diameter, which is greater than a diameter of the sensor tube, wherein the tubular insert has one end configured as a flange. The tubular insert with flange enables a solid seat of the sensor tube and the provision of a stable support of the sensor tube in relation to the insulating member.

According to another feature of the present invention, the support plate may have an opening for passage of the sensor tube, wherein welding bosses are arranged in an abutting joint area of the support plate and the tubular insert. In this way, a sufficiently stable and permanent welding connection can be implemented.

According to another feature of the present invention, the sensor tube may have a flanged shoulder for support upon the insulating member in the area of the opening, or for support upon the tubular insert, thereby realizing a cost-efficient support which is easy to make.

A stable seat of the sensor tube may also be realized, when the sensor tube has in the area of the opening of the insulating member a diameter which is greater than a diameter of a sensor tube portion projecting into the insulating member. By widening the end of the sensor tube in this manner, the bending moment, required for a flexure, is increased.

According to another aspect of the present invention, a temperature sensor includes a sensor tube having a free end, a sensor rod received in the interior of the sensor tube and having a thermal expansion coefficient which differs from a thermal expansion coefficient of the sensor tube, with the sensor rod having one end, which is supported by an end piece in the area of the free end of the sensor tube, and another end, which forms an actuating element of a switching contact assembly, wherein the end piece has a configuration of a tubular cap which is permanently placed over the free end of the sensor tube, wherein the one end of the sensor rod is supported against an inner side of the tubular cap, which inner side confronts the interior of the sensor tube.

Through the provision of the tubular cap, the outermost end of sensor tube is capped and extended by the dimension of the outwardly projecting portion of the tubular cap, so that at least the entire tube length is available as active length. When the tubular cap has a similar thermal expansion coefficient as the sensor tube, the active length thereof is enlarged. In addition, the provision of the tubular cap results in a reliable closure of the sensor tube so that the sensor tube is completely sealed off against the outside, and external influences are reliably prevented from affecting the expansion behavior of a temperature sensor according to the invention.

According to another feature of the present invention, the tubular cap may be welded, e.g. through laser welding, to the sensor tube in order to realize a permanent and sufficiently firm connection between the tubular cap and the sensor tube.

According to another feature of the present invention, the tubular cap may be formed by a tubular piece having an inner diameter which is greater than an outer diameter of the sensor tube. The tubular cap may have any suitable configuration as long as it is assured that the sensor rod, received in the sensor tube, is securely-supported in relation to the end zone of the sensor tube. The tubular cap in the form of a tubular piece is simple to make and can easily be suited to the sensor tube.

According to another feature of the present invention, the tubular piece may have on one side a flat end surface which extends substantially normal to the axis of the sensor tube.

According to an alternative variation of the present invention, the tubular cap may be formed by a tubular piece, which is pushed into the free end of the sensor tube, wherein the free end of the sensor tube has an end zone defined by an inner diameter which is greater than an inner diameter of the sensor tube. Thus, the inner diameter of the end zone is greater than an outer diameter of the tubular piece. As the end zone of the sensor tube has a greater diameter, the tubular cap can be inserted into the sensor tube and secured there. Even though the so-inserted tubular piece partly projects into the sensor tube, the active length of the sensor tube is not shortened as the sensor rod is supported by the end surface of the tubular portion projecting beyond the sensor tube.

According to another feature of the present invention, the tubular piece may be closed on one side by a flat end surface which extends substantially normal to the axis of the sensor tube. The end of the sensor rod is hereby supported by the inner side of this end surface. The end surface of the tubular piece may suitably have a central inwardly directed curvature, e.g. in form of a spherical calotte, for support of the sensor rod. In this way, the sensor rod is precisely positioned within the sensor tube. During tilting of the sensor rod, the curvature reduces changes in the support length which affect the switching behavior of the temperature sensor.

In order to enable application of a temperature sensor according to the invention in a high temperature environment, it may be suitable to make the sensor tube of metal, preferably of a CrNi alloy.

The sensor tube may also be made of a material having a thermal expansion coefficient which is significantly lower than the thermal expansion coefficient of metal. Examples include ceramics or quartz glass.

In the event, the tubular cap has a same thermal expansion coefficient as the sensor tube, the arrangement of the tubular cap results in a prolongation of the sensor tube up beyond its end, resulting in an increase of the active length of the sensor tube. Suitably, the tubular cap is made of high temperature-resistant metal, preferably of a CrNi alloy.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
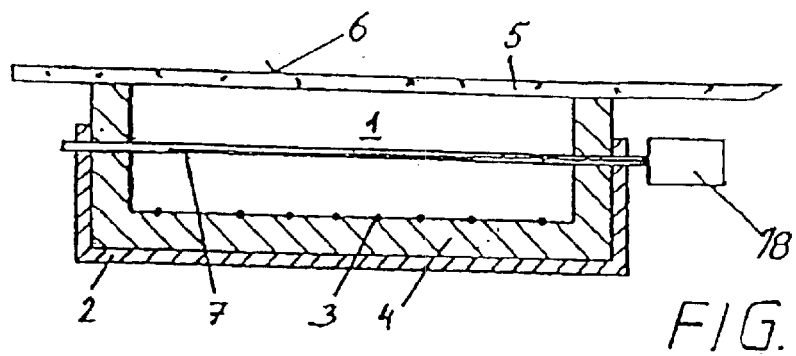
FIG. 1 is a schematic sectional view of a heating element, taken along the line I—I of FIG. 2 and having embodied therein a temperature sensor according to the present invention.

Throughout all the Figures, same or corresponding elements are generally indicated by same reference numerals. These depicted embodiments are to be understood as illustrative of the invention and not as limiting in any way.

Figure 2:
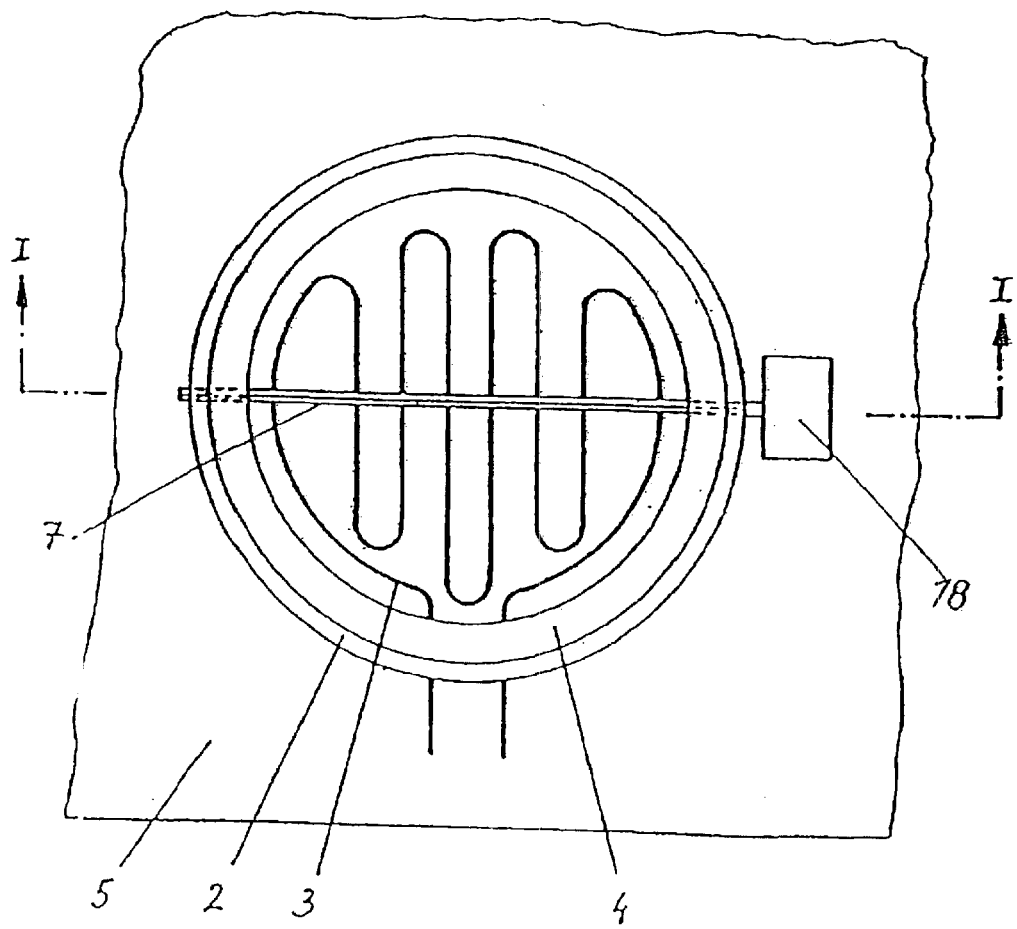
FIG. 2 is a top plan view of the heating element of FIG. 1.

Turning no to the drawing, and in particular to FIGS. 1 and 2, there is shown a heating element 1 of a radiation-type cooking range, with the heating element 1 positioned beneath a plate-shaped cooktop 5 of metal, glass ceramics or the like which forms the cooking surface 6 for placement and heating of pots, pans or the like cooking utensils. The heating element 1 includes a cup-shaped frame 2 which forms the bottom of the heating element 1 and accommodates a spirally configured heating coil 3 which is embedded in a cup-shaped embedment body 4 and operates when energized to heat the lower surface of the cooktop 5. Arranged between the cooktop 5 and the heating coil 3 is a temperature sensor for sensing the temperature below the cooking surface 6 in the radiation space between the cooking surface 6 and the heating coil 3. The temperature sensor 7 extends across the embedment body 4 and has opposite ends projecting outwards through aligned bores in the side walls of the embedment body 4 and the frame 2. One end of the temperature sensor 7 is in communication with a switch head 18 to supply electric power to the heating coil 3.

The temperature sensor 7 is exposed to the temperature in the radiation space between the heating coil 3 and cooktop 5 and able to ascertain the temperature to thereby allow temperature regulation of the cooktop 5 and the thereby controlled switch head 18. Of course, the present invention is not limited to this particular application.

Figure 3:
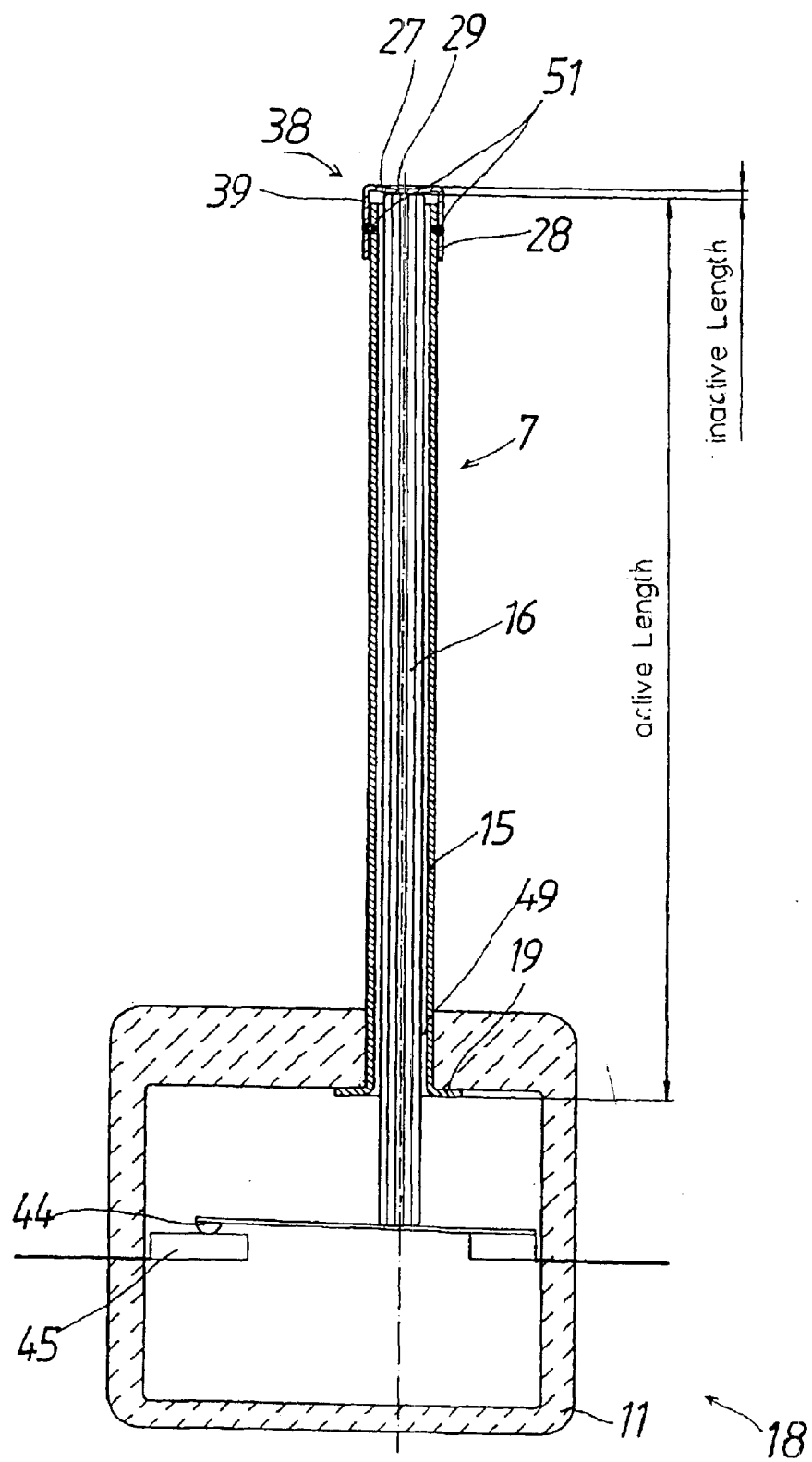
FIG. 3 is a longitudinal section of a first embodiment of a temperature sensor according to the invention.

Turning now to FIG. 3, there is shown the inner components and mode of operation of the temperature sensor 7 which includes a sensor tube 15 and a sensor rod 16 arranged within the sensor tube 15, whereby the sensor tube 15 and the sensor rod 16 have different thermal expansion coefficients. As the temperature sensor 7 is heated, the sensor tube 15 and the sensor rod 16 are subject to different thermal elongation. The sensor rod 16 has one end, which is supported by an end piece 38 in the area of the free end of the sensor tube 15, and another end, which is configured as actuating element of a switching contact assembly 44, 45 within the switch head 18. Thus, the difference in thermal elongation between the sensor tube 15 and the sensor rod 16 results in a relative shift of the sensor rod end confronting the free end of the sensor tube 15 and ultimately to an actuation of the switching contact assembly 44, 45. Although not shown in FIG. 3, the temperature sensor 7 includes, e.g., a spring to urge the sensor rod 16 against the end piece 38 of the sensor tube 15.

When the thermal expansion coefficient of the sensor tube 15 is greater than the thermal expansion coefficient of the sensor rod 16, the end of the sensor rod 16 confronting the switching contact assembly 44, 45 shifts upwards, as a heat-up occurs in the area of the temperature sensor 7 so that the contact spring 44, pressed against the contact piece 45, opens the closed switching contact. The switch characteristics of the switching contact assembly 44, 45 of the switch head 18 can be influenced through suitable selection of the thermal expansion coefficients of sensor tube 15 and sensor rod 16, and through respective disposition of the end piece 38.

In the exemplified embodiment of FIG. 3, the sensor tube 15 is made of metal, in particular of a high temperature-resistant metal, preferably a CrNi alloy, whereas the sensor rod 16 is made of ceramics or quartz glass.

At its end facing the switching contact assembly 44, 45, the sensor tube 15 is provided with a flange 19 for support of the sensor tube 15 against an insulating member 11, which surrounds the switching contact assembly 44, 45. The sensor tube 15 is hereby guided through an opening 49 of the insulating member 11. Suitably, the insulating member 11 is made of temperature-resistant ceramics and is mounted immovable to the heating element 1 or other device to enable a reproducible temperature measurement.

As further shown in FIG. 3, the end piece 38 of the sensor tube 15 is formed by a tubular cap 39 which caps the free end of the sensor tube 15 and is permanently connected to the sensor tube 15, whereby the one end of the sensor rod 16 is supported by the tubular cap 39 on its inner side, which faces the interior of the sensor tube 15. Suitably, the tubular cap 39 is welded to the sensor tube 15, in particular through laser welding. Hereby, the tubular cap 39 is placed over the free end of the sensor tube 15 and then welded thereto through laser application. The welded seam should withstand the pressure of the sensor rod 16 acting against the inside of the tubular cap 39.

As shown in FIG. 3, the sensor tube 15 has a circular cross section, although any other desired cross section is conceivable as well. Likewise, the sensor rod 16 may have any desired cross section. The tubular cap 39 is formed by a tubular piece 28 which has an inner diameter that is greater than the outer diameter of the sensor tube 15 and is topped on one side by a flat, planar end surface 27 in substantially normal relationship to the tube axis. The tubular piece 28 provided with such an end surface 27 may be formed, e.g., from a deep-drawn sheet metal blank. The tubular piece 28 is placed over the free end of the sensor tube 15 and welded thereto. The end surface 27 of the tubular piece 28 includes a central, inwardly directed curvature, e.g. in the form of the spherical calotte 29, for support of the sensor rod 16. Suitably, the tubular cap 39 is made of a same metal as the sensor tube 15, in particular of a high temperature-resistant metal, preferably a CrNi alloy.

The relative movement between the sensor tube 15 and the sensor rod 16 as a result of the temperature increase depends on the different thermal expansion coefficients, on the difference in temperature, as well as on the actively acting length of the combination sensor tube and sensor rod, responsible for the expansion movement. The advantage of the tubular cap 39 resides in the available substantial actively length of the temperature sensor 7 for the temperature expansion, as can be seen in FIG. 3. As the tubular cap 39 is also subject to a heat expansion, which is added to the heat expansion of the sensor tube 15, the length differential is increased in relation to the heat expansion of the sensor rod 16 which has a lower thermal expansion coefficient. The inactive length, as indicated in FIG. 3, corresponds hereby practically only to the wall thickness of the end surface 27 of the tubular cap 39.

Figure 6:
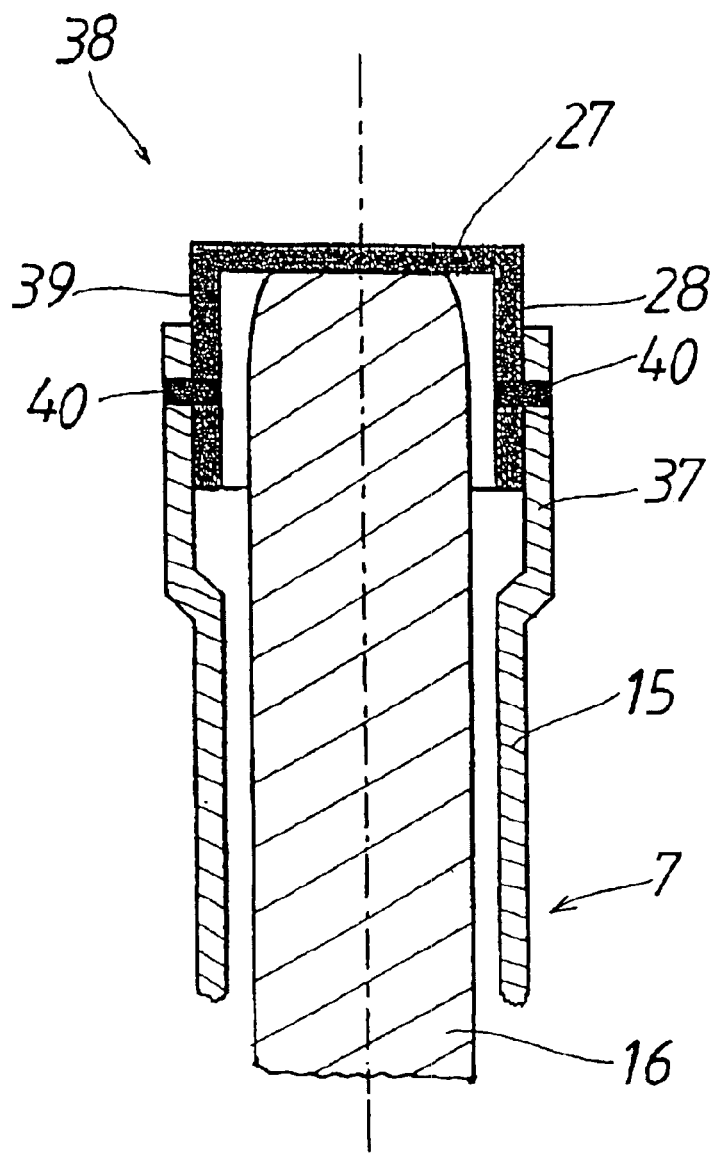
FIG. 6 is a cutaway sectional view of a fourth embodiment of a temperature sensor according to the invention.

FIG. 6 shows another embodiment of a temperature sensor 7 according to the present invention. Parts corresponding with those in FIG. 3 are generally denoted by identical reference numerals and not explained again. In this embodiment, the tubular cap 39 is formed by a tubular piece 28 which is inserted into the free end of the sensor tube 15 and has a planar end surface 27. The free end of the sensor tube 15 includes an end zone 37 which has an inner diameter that is greater than the inner diameter of the remainder of the sensor tube 15. Thus, the inner diameter of the end zone 37 is greater than the outer diameter of the tubular piece 28. The tubular cap 39 is placed in the enlarged end zone 37 and welded or riveted at attachment points 40.

Figure 4:
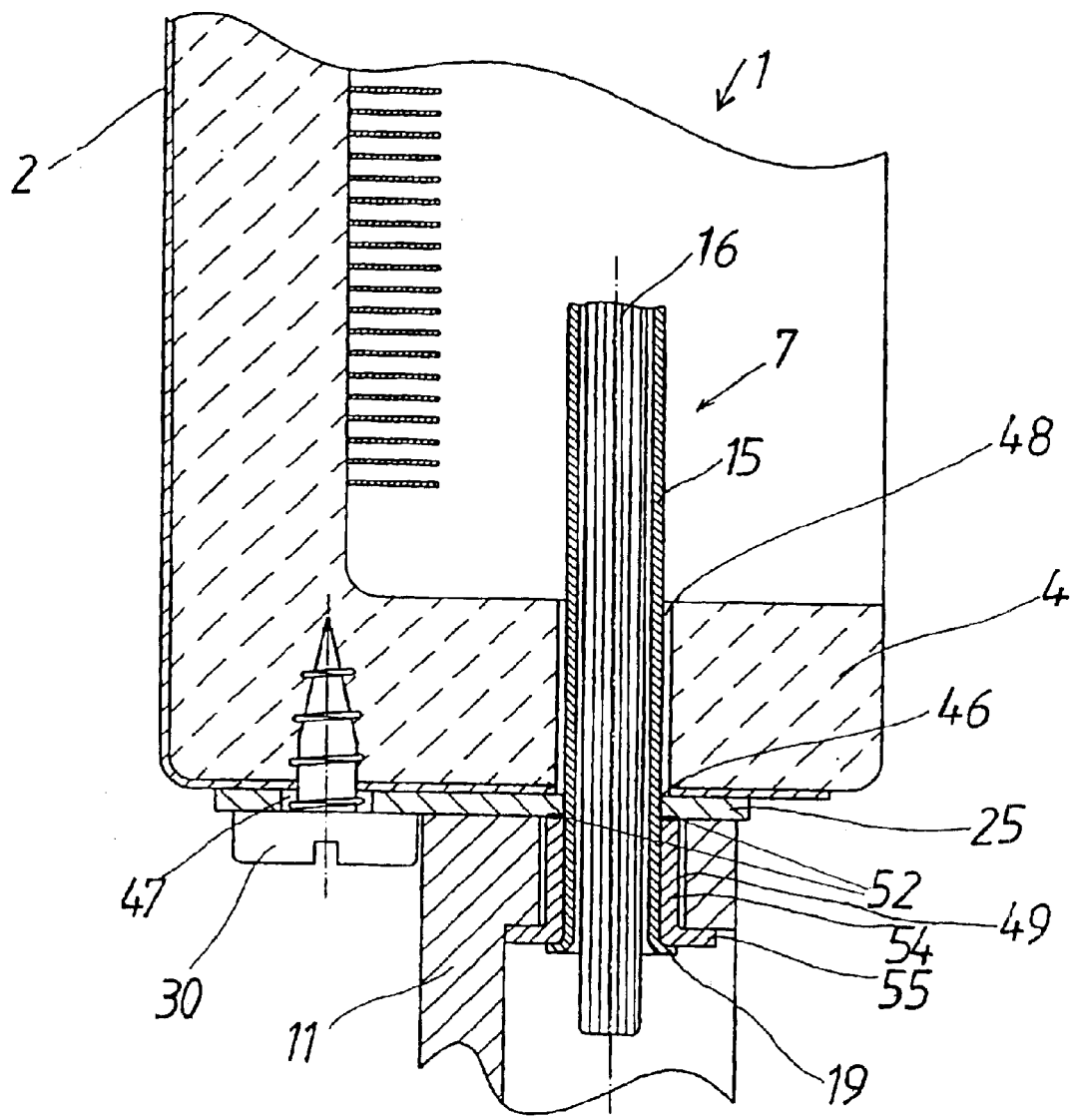
FIG. 4 is a cutaway sectional view of a second embodiment of a temperature sensor according to the invention.

As described above, the insulating member 11, shown by way of example in FIG. 3, should be immovably secured to the heating element 1 or other suitable device. This is realized by the arrangement of a support plate 25, as shown in FIG. 4. The support plate 25 has bores 47 for securement of the temperature sensor 7 to the heating element 1 by means of screw fasteners 30 which are driven through the bores 47 into the insulating member 4. The support plate 25 is connected with a tubular insert 54 which is placed in the opening 49 of the insulating member 11 for support of the sensor tube 15 via the flanged shoulder 19. The sensor tube 15 may hereby be positioned at great play or with little play, or may be press-fitted in or welded to the tubular insert 54.

In accordance with the invention, the support plate 25 is welded to the tubular insert 54 so that the wall area of the insulating member 11, adjacent to the opening 49, is held between the support plate 25 and the tubular insert 54. In this manner, the tubular insert 54 is connected with the support plate 25 in such a manner that the tubular insert 54 is prevented from sliding or tilting in relation to the insulating member 11. The tubular insert 54 has a tubular configuration with an outer diameter, which is smaller than the diameter of the opening 49, and an inner diameter, which is greater than the diameter of the sensor tube 15. Formed on one end of the tubular insert 54 is a tubular flange 55 which rests against the wall of the insulating member 11.

To enable a passage of the sensor tube 15, the support plate 25 has an opening 46, whereby welding bosses 52 are arranged, e.g. stamped, in the region of the adjoining area with the tubular insert 54 to simplify welding of the tubular insert 54 with the support plate 25. As soon as the tubular insert 54 is inserted from one side of the opening 49, and the support plate 25 is positioned from the other side of the opening 49 in abutting contact with the tubular insert 54, the welding process can be carried out through suitable application of electrodes and supply with current. The support plate 25 rests hereby with its welding bosses 52 upon the end surface of the tubular insert 54. As the transition resistance at the welding bosses 52 is especially high, a welding arc is ignited there so that the welding process is preferably implemented in the area of the welding bosses 52.

Figure 5:
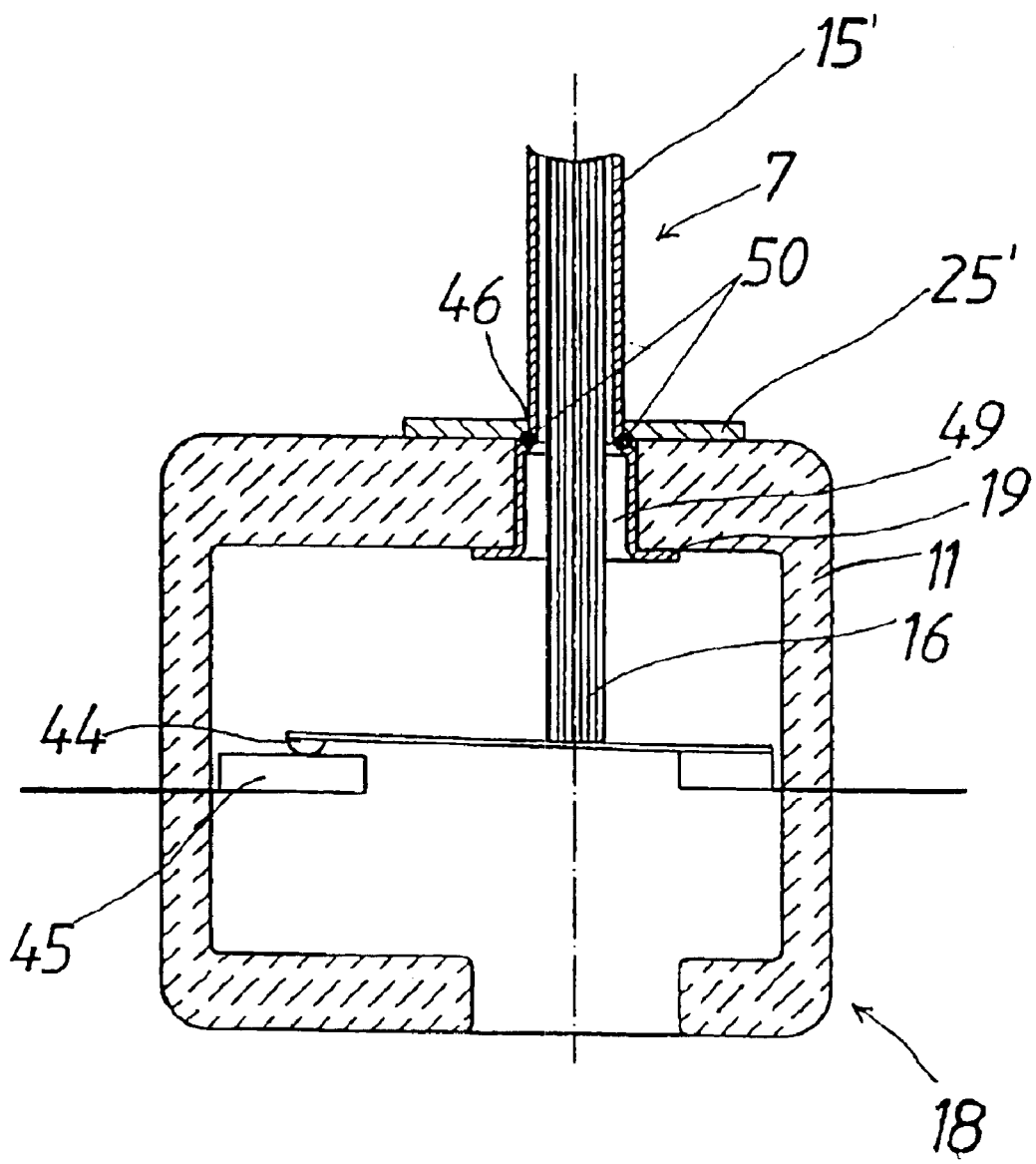
FIG. 5 is a cutaway sectional view of a third embodiment of a temperature sensor according to the invention.

FIG. 5 shows another embodiment of a temperature sensor 7 according to the present invention. Parts corresponding with those in FIG. 4 are generally denoted by identical reference numerals and not explained again. In this embodiment, the support plate 25' is welded directly to the sensor tube 15 supported in the opening 4 of the insulating member 11. Thus, the wall area, adjacent the opening 49 of the insulating member 11, is held between the support plate 25' and the sensor tube 15. In order to enhance the stability of the sensor tube 15' in relation to the insulating member 11, the sensor tube 15' is formed in the area of the opening 49 with a greater diameter than in the area projecting beyond the opening 49. Also in this embodiment, the sensor tube 15 is made, preferably, of metal, in particular of a high temperature-resistant metal, preferably a CrNi alloy, and welded to the support plate 25 at welding bosses 50.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A temperature sensor comprising:
   a sensor tube;
   a sensor rod received in the sensor tube and having a thermal expansion coefficient which differs from a thermal expansion coefficient of the sensor tube, said sensor rod having one end, which is supported by a free end of the sensor tube, and another end, which forms an actuating element of a switching contact assembly;
   an insulating member constructed to at least partly surround the switching contact assembly and having an opening for passage of the sensor tube with accommodated sensor rod;
   a support plate mounted to the insulating member in the area of the opening and connected at least indirectly to the sensor tube by a welding process such that an opening-surrounding wall portion of the insulating member is held in place, and
   a tubular insert placed into the opening for support of the sensor tube, said support plate welded to the tubular insert so that the opening-surrounding wall portion of the insulating member is held between the support plate and the tubular insert.

2. The temperature sensor of claim 1, wherein the support plate is welded directly to the sensor tube so that the opening-surrounding wall portion of the insulating member is held between the support plate and the sensor tube.

3. The temperature sensor of claim 1, wherein the sensor tube is made of metal.

4. The temperature sensor of claim 1, wherein the sensor tube is made of high temperature-resistant metal.

5. The temperature sensor of claim 1, wherein the sensor tube is made of a CrNi alloy.

6. The temperature sensor of claim 1, wherein the support plate has at least one bore for allowing attachment of the temperature sensor to a heating element.

7. The temperature sensor of claim 1, wherein the tubular insert has an outer diameter, which is smaller than a diameter of the opening of the insulation member, and an inner diameter, which is greater than a diameter of the sensor tube, said tubular insert having one end configured as a tubular flange.

8. The temperature sensor of claim 7, wherein the support plate has an opening for passage of the sensor tube, wherein welding bosses are arranged in a joint area of the support plate and the tubular insert.

9. The temperature sensor of claim 1, wherein the sensor tube has a flanged shoulder for support upon the insulating member in the area of the opening.

10. The temperature sensor of claim 1, wherein the sensor tube has a flanged shoulder for support upon the tubular insert.

11. The temperature sensor of claim 1, wherein the sensor tube has in the area of the opening of the insulating member a diameter which is greater than a diameter of a sensor tube portion projecting into the insulating member.

12. A temperature sensor, comprising:
    a sensor tube having a free end and defining an interior;
    a sensor rod received in the interior of the sensor tube and having a thermal expansion coefficient which differs from a thermal expansion coefficient of the sensor tube, said sensor rod having one end, which forms an actuating element of a switching contact assembly, and another end; and
    an end piece for supporting the other end of the sensor rod in the area of the free end of the sensor tube, said end piece having a configuration of a tubular cap which is permanently placed over the free end of the sensor tube, wherein the one end of the sensor rod is supported against an inner side of the tubular cap, which inner side confronts the interior of the sensor tube, said tubular cap having a thermal expansion coefficient which substantially corresponds to the thermal expansion coefficient of the sensor tube, thereby effectively extending an active length of the sensor tube.

13. The temperature sensor of claim 12, wherein the tubular cap is welded to the sensor tube.

14. The temperature sensor of claim 12, wherein the tubular cap is connected to the sensor tube through laser welding.

15. The temperature sensor of claim 12, wherein the tubular cap is a tubular piece having an inner diameter which is greater than an outer diameter of the sensor tube.

16. The temperature sensor of claim 15, wherein the sensor tube is defined by an axis, said tubular piece having on one side a flat end surface which extends substantially normal to the axis of the sensor tube.

17. The temperature sensor of claim 16, wherein the end surface of the tubular piece has a central inwardly directed curvature for support of the sensor rod.

18. The temperature sensor of claim 17, wherein the curvature has the shape of a spherical calotte.

19. The temperature sensor of claim 12, wherein the tubular cap is a tubular piece pushed into the free end of the sensor tube, wherein the free end of the sensor tube has an end zone defined by an inner diameter which is greater than an inner diameter of the sensor tube so that the inner diameter of the end zone is greater than an outer diameter of the tubular piece.

20. The temperature sensor of claim 19, wherein the sensor tube is defined by an axis, said tubular piece having on one side a flat end surface which extends substantially normal to the axis of the sensor tube.

21. The temperature sensor of claim 20, wherein the end surface of the tubular piece has a central inwardly directed curvature for support of the sensor rod.

22. The temperature sensor of claim 21, wherein the curvature has the shape of a spherical calotte.

23. The temperature sensor of claim 12, wherein the sensor tube is made of metal.

24. The temperature sensor of claim 12, wherein the sensor tube is made of high temperature-resistant metal.

25. The temperature sensor of claim 12, wherein the sensor tube is made of a CrNi alloy.

26. The temperature sensor of claim 12, wherein the sensor tube is made of ceramics or quartz glass.

27. The temperature sensor of claim 12, wherein the tubular cap is made of high temperature-resistant metal.

28. The temperature sensor of claim 12, wherein the tubular cap is made of a CrNi alloy.

* * * * *